United States Patent [19]

Wagner et al.

[11] Patent Number: 5,669,559
[45] Date of Patent: Sep. 23, 1997

[54] PROCESS FOR PULVERISING POLYURETHANE, POLYUREA AND/OR POLYURETHANE/POLYUREA MATERIALS IN A ROLLER MILL

[75] Inventors: Joachim Wagner, Leverkusen; Karl Peltzer, Leichlingen; Jürgen Wirth, Köln, all of Germany

[73] Assignees: Bayer Aktiengesellschaft; Maschinenfabrik Hennecke GmbH, both of Leverkusen, Germany

[21] Appl. No.: 591,613

[22] PCT Filed: Jul. 18, 1994

[86] PCT No.: PCT/EP94/02360

§ 371 Date: Jan. 24, 1996

§ 102(e) Date: Jan. 24, 1996

[87] PCT Pub. No.: WO95/03926

PCT Pub. Date: Feb. 9, 1995

[30] Foreign Application Priority Data

Jul. 30, 1993 [DE] Germany ............ 43 25 654.6
May 13, 1994 [DE] Germany ............ 44 16 749.0

[51] Int. Cl.$^6$ .................................................. B02C 19/12
[52] U.S. Cl. .................... 241/23; 241/24.28; 241/80; 241/29
[58] Field of Search ............. 241/80, 97, 24.28, 241/166, 167, 23, 29

[56] References Cited

U.S. PATENT DOCUMENTS

| 2,686,011 | 8/1954 | Oishi .................................. 241/167 |
| 3,372,878 | 3/1968 | Verdier . |
| 4,684,070 | 8/1987 | Dicky . |
| 4,687,144 | 8/1987 | Irwin et al. . |

FOREIGN PATENT DOCUMENTS

| 2086780 | 7/1993 | Canada . |
| 2111537 | 6/1994 | Canada . |
| 573038 | 8/1993 | European Pat. Off. . |
| 3823929 | 2/1989 | Germany ............ 241/80 |
| 4019272 | 12/1991 | Germany ............ 241/80 |
| 3526 | 2/1965 | Japan ............ 241/24.28 |

*Primary Examiner*—Mark Rosenbaum
*Attorney, Agent, or Firm*—Joseph C. Gil; Noland J. Cheung

[57] ABSTRACT

When pulverising polyurethane, polyurea and/or polyurethane/polyurea materials in a roller mill with at least two rollers (2,3) rotating at different circumferential speeds, a very economical method of operation is achieved by returning the coarse fraction falling freely out of the roll slit (4) to the roll slit (4) and stripping the fine material adhering to the roller (3) with the higher circumferential speed and discharging it separately from the coarse fraction.

8 Claims, 7 Drawing Sheets

PROCESS FOR PULVERISING POLYURETHANE, POLYUREA AND/OR POLYURETHANE/POLYUREA MATERIALS IN A ROLLER MILL

The invention relates to a process for pulverising polyurethane, polyurea and/or polyurethane/polyurea materials in a roller mill whose at least two rollers rotate at different circumferential speeds, wherein the material to be milled is fed to the roll slit formed by the rollers and after its passage is separated into a coarse fraction and a fine fraction, the coarse fraction being returned to the roll slit and the fine fraction being passed on for further processing.

In recent years, the recycling of plastics has obtained a very high status. Possibilities have even been sought for the material recycling of cross-linked polyurethanes, such as are used, for example, for highly stressed motor vehicle bumpers. For recycling, it is generally necessary to comminute, and in particular to mill, these scrap materials in order to be able to re-use them in powder form, in particular as fillers. Particularly fine pulverisation is required if they are to be added as fillers to formulations for polyurethane reactive systems. The use of roller mills is known (DE 42 07 972-A1). Milling leads to a mixture of a large quantity of very coarse and a small quantity of already fine particles. The coarse particles are screened out and returned to the gap between the rollers. This screening process is very uneconomical because the screen is loaded with a large quantity of very large particles and thus comparatively small quantitites of fine material are obtained.

The object of the present invention is to improve the previously known process in order to make it more economical.

This object is achieved by collecting and returning the coarse particles which fall freely downstream of the roll slit, while the fine fraction which remains as a sheet adhering to the roller with the larger circumferential speed is discharged separately from the coarse fraction.

According to the known process, both rollers were cleaned with a scraper so that all the milled material was fed to the screen. In contrast, according to the invention, the sheet consisting of the fine fraction, which forms on the roller which rotates more rapidly during the pulverisation of the materials mentioned above, can be utilised so that this sheet is no longer passed to the freely falling coarse fractions, but is discharged separately.

Obviously the sheet also contains some coarse fractions, but the particle size spectrum is very favourably shifted to the finer end.

For many possibilities for recycling, the fine fraction can therefore be directly re-used. However, if a particularly fine powder is required, then the sheet consisting of the fine fraction is preferably classified again into coarse and fine particles. Known screening methods can be used for this purpose. When screening in this process step, the fine fraction is much larger and may even be larger than the coarse fraction. If there is a possibility of direct re-use for the now relatively small coarse particles then these are discharged, but on the other hand they may be returned to the roll slit for re-milling.

It is understood that the sheet may also be stripped off and fed to another roll slit.

One particularly advantageous variant comprises feeding the sheet adhering to the roller, by means of this roller, directly to the roll slit formed between this roller and a third roller.

However, since this third roller has to be arranged in such a way that it rotates upwards, the coarse fraction here cannot—as in the first roll slit—be separated by free falling. Thus, if the coarse particles are required to be isolated once again after passage through the second roll slit, screening must be carried out.

Preferably, the coarse fraction to be recirculated is cooled.

There is considerable friction during the comminuting process and heat is therefore produced. Since some of the particles in the coarse fraction pass through the roll slit several times, the milled material would become hot, and thus damaged, if no cooling were provided.

The starting materials for performing the process are preferably a polyurethane flexible foam, a polyurethane structural foam or a RIM material made of polyurethane, polyurethane/polyurea or of polyurea. These materials are distinguished by having a particularly pronounced tendency to form a sheet during milling. Powders from these materials are however particularly suitable for recycling.

The powders produced by the new process can be fed to conventional thermoplastic processing and relatively easily processed and blended together with the thermoplastics. Extremely finely powdered polyurethane can be used advantageously in chemolytic processes such as e.g. glycolysis, aminolysis and hydrolysis. The powdered form is also advantageous for extrusion. This is especially true when powder from lacquered RIM structural parts is used as starting material. Polyurethanes can only be introduced in the form of very fine powders as fillers into polyurethane reaction mixtures to be re-processed. The powder produced according to the invention can also advantageously be used for thermal processing techniques.

The preparation of the polyurethane, polyurea and/or polyurethane/polyurea materials from which the powder is subsequently obtained for recycling, takes place by methods known per se from polyurethane chemistry. They are nonmelting, and therefore thermoset, materials. From which chemical formulations these materials are obtained and how they are processed to form articles (bumpers, instrument panels, side-aprons, spoilers, etc. for the motor vehicle industry, furniture, housings etc.) is described, inter alia, in Kunststoff-Handbuch, Polyurethane, 2nd ed., Carl Hanser Verlag, Munich/Vienna (1983).

Figure 1:
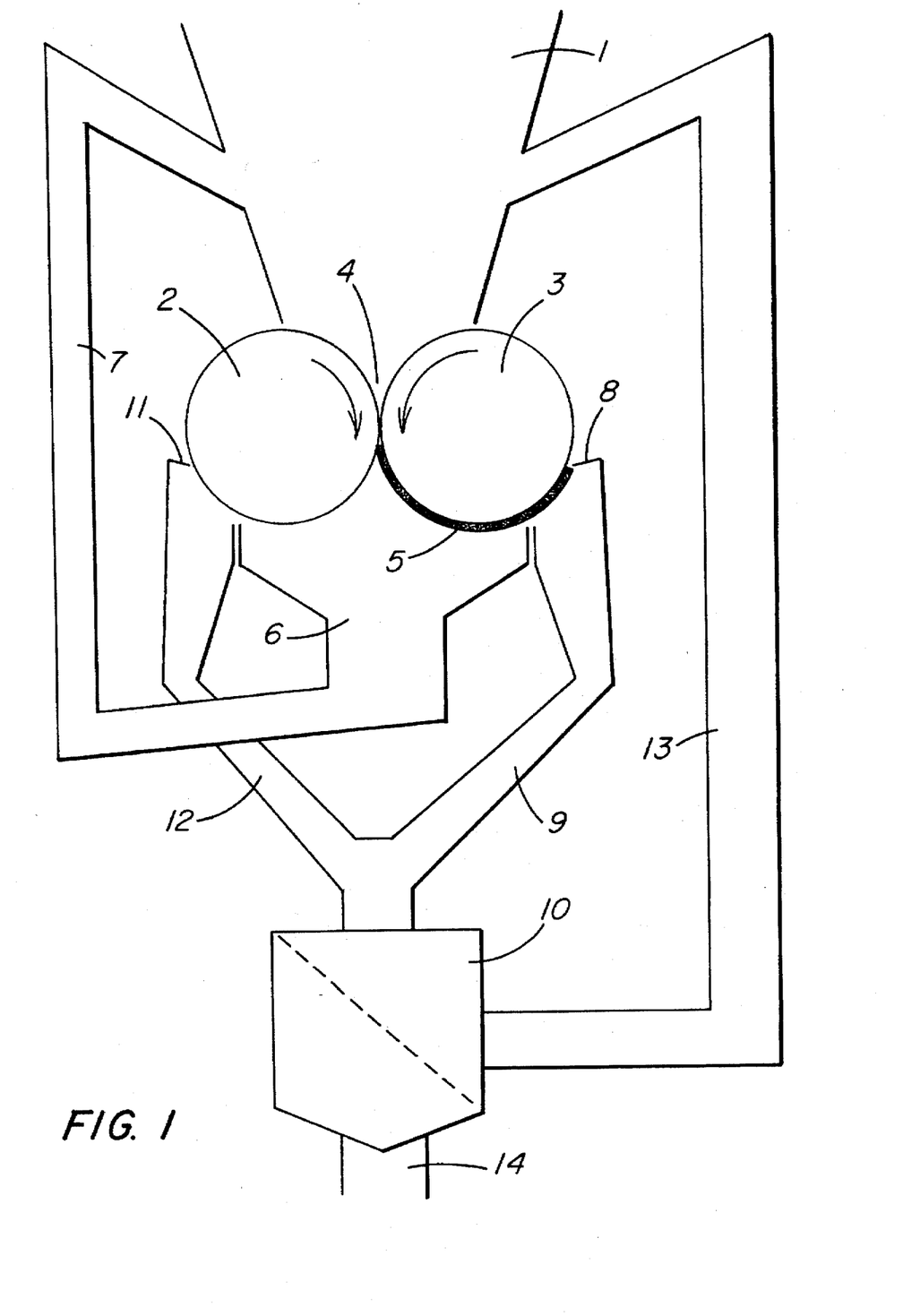
FIG. 1 is a schematic view of an embodiment of the process wherein the precomminuted scrap material is fed through a roll slit and separated into a coarse fraction and a sheet of fine particles.

The drawings show a purely schematic representation of the process in several versions using a diagram of the relevant milling units and the process is explained in more detail in the following:

When performing the process in accordance with the diagram shown in FIG. 1, scrap material which has been precomminuted to a suitable size reaches a roll Slit 4 formed between two rollers 2, 3 via a feed hopper 1. The rollers 2, 3 have the same diameter; roller 3 does however rotate at a higher circumferential speed. A sheet 5 of finer particles is formed on roller 3, while the coarse fraction falls freely into a collecting hopper 6 and is returned to feed hopper 1 by means of a conveyer 7, for example by means of a drag chain. The sheet 5 is detached from roller 3 by a scraper 8 and is delivered to screening device 10 via chute 9. Roller 2 is also cleaned of residues by scraper 11, and these are also delivered to screening device 10 via chute 12. The screened coarse fraction is returned to feed hopper 1 via conveyer 13, while the fine fraction is removed via outlet 14 and is fed to a temporary storage facility or passed on directly for further processing. If the particles of the fine fraction obtained from sheet 5 are sufficiently small, screening can even be omitted and they can be directly re-processed. In this case screening device 10 and conveyer 13 are superfluous.

Figure 2:
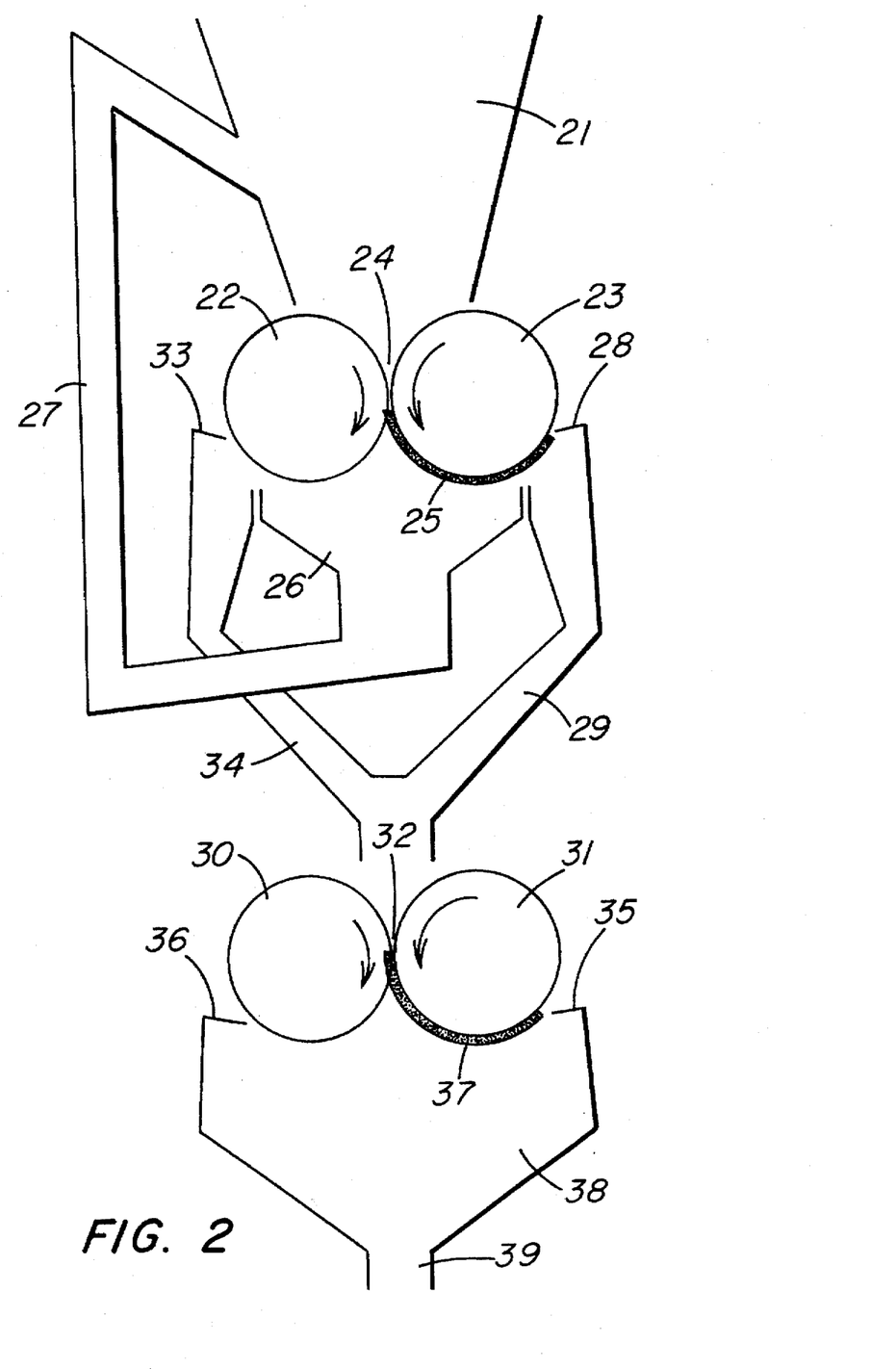
FIG. 2 is a schematic view of another embodiment of the process wherein a second set of rollers is located thereunder the feed hopper situated under the first set of rollers.

When performing the process in accordance with the diagram shown in FIG. 2, scrap material which has been precomminuted to a suitable size reaches a roll slit 24 formed between two rollers 22, 23, via a feed hopper 21. The rollers 22, 23 have the same diameter; roller 23 does however rotate more rapidly. A sheet 25 of fine particles is formed thereon, while the coarse particles fall freely into collecting hopper 26 arranged thereunder, and are returned to feed hopper 21 via conveyer 27. Sheet 25 is detached from roller 23 with a scraper 28 and reaches a second roll slit 32 formed by two rollers 30, 31, of which roller 31 rotates more rapidly, via chute 29. A scraper 33 is also arranged on roller 22, and this removes residues which are also fed to roll slit 32 via chute 34. After passage through roll slit 32, the milled material may be passed on for further processing.

The milled material may of course also be separated into a coarse fraction and a fine fraction at the second pair of rollers 30, 31—in precisely the same way as after-the first pair of rollers 22, 23. Scrapers 35, 36 remove residues or a sheet 37 from rollers 30, 31 respectively. The milled material is collected in a hopper 38 and withdrawn through outlet 39. In this way it is possible to return the coarse fraction to roll slit 32 or to roll slit 24, provided the mill is equipped with the conveyers required for this purpose.

Figure 3:
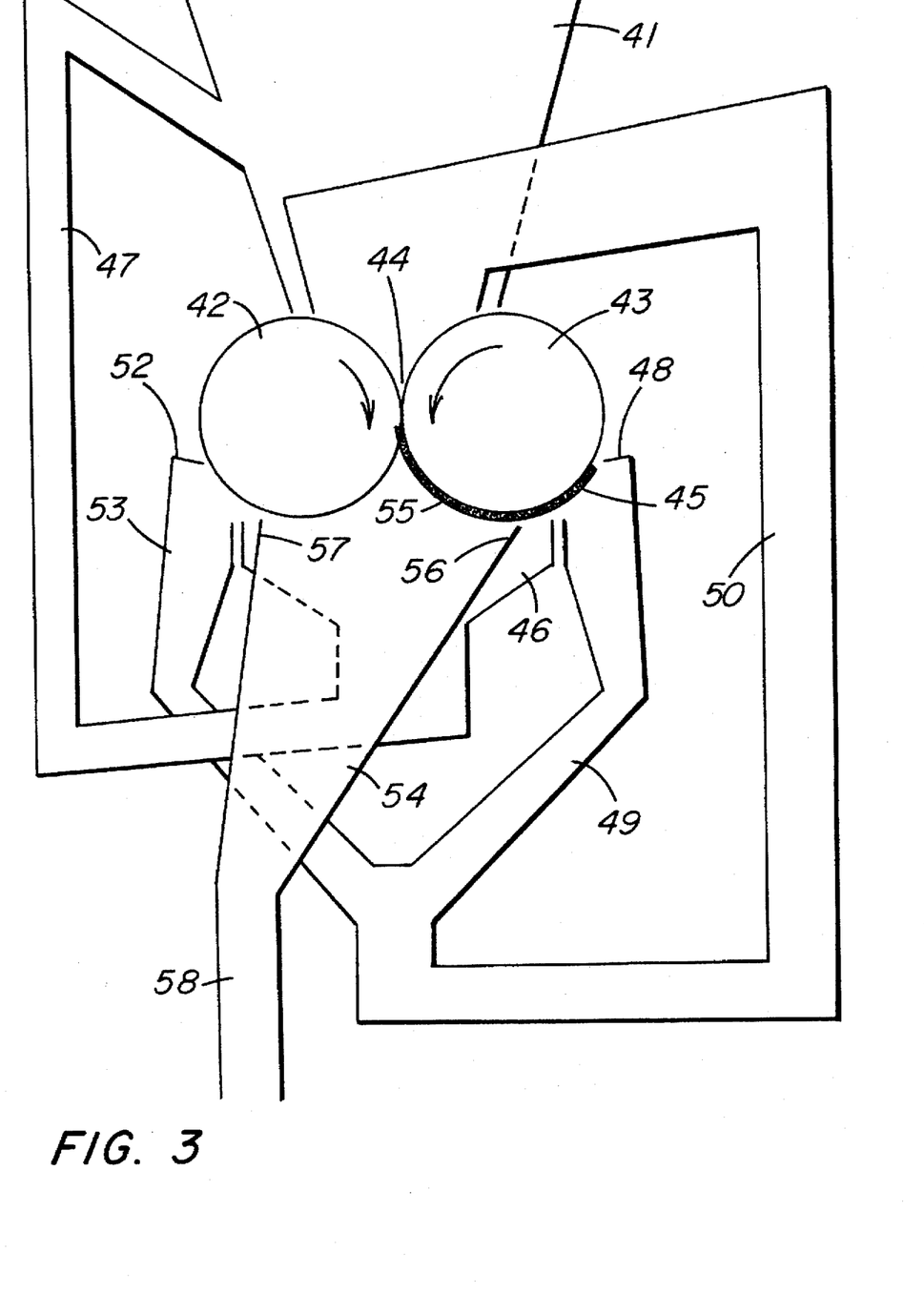
FIG. 3 is a schematic view of another embodiment of the process wherein the front view of a mill is shown without the first set of rollers.
Figure 4:
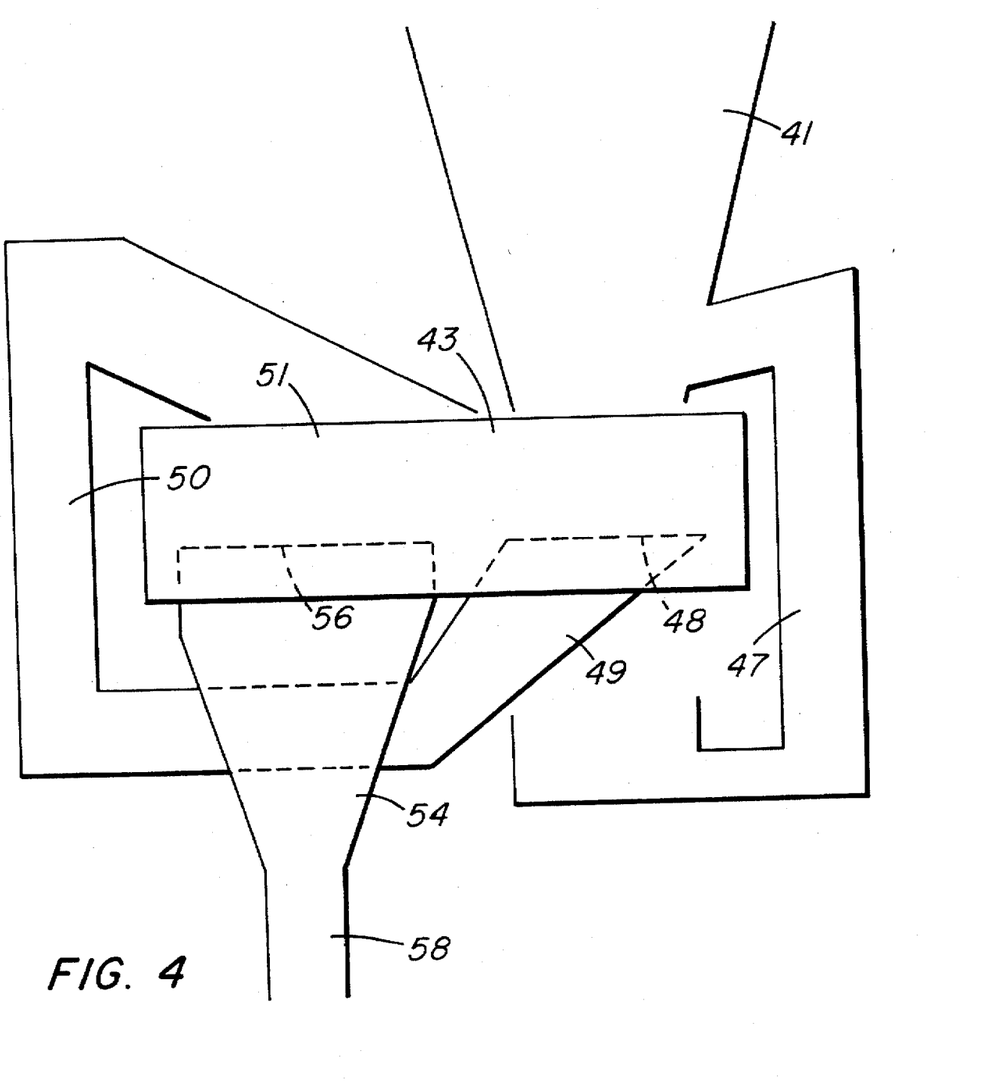
FIG. 4 is a schematic side view of mill shown in FIG. 3.

To perform a third variant of the process, FIG. 3 shows the front view of a mill and FIG. 4 shows the side view. The difference from the mill shown in FIG. 2 is essentially that instead of a second pair of rollers below the feed hopper 41, only one pair of rollers 42, 43 is used, which is however longer. The material to be milled which has been precomminuted to a suitable size passes through roll slit 44. A sheet 45 of fine material forms on the more rapidly rotating roller 43, while the coarse fraction falls freely into a feed hopper 46 and is returned to feed hopper 41 via conveyer 47. Sheet 45 is detached from the more rapidly rotating roller 43 by means of scraper 48 and is delivered to a second area 51 (FIG. 4) located outside the range of feed hopper 41 via chute 49 and conveyer 50. The residues are also removed from roller 42 by means of scraper 52 and they also reach conveyer 50 via chute 53. After passing through roll slit 44 in area 51, the coarse fraction falls into chute 54. The residue adhering to roller 42 in area 51 and sheet 55 located on roller 43 are removed by scrapers 56, 57 and are delivered together to an outlet 58 via chute 54.

Figure 5:
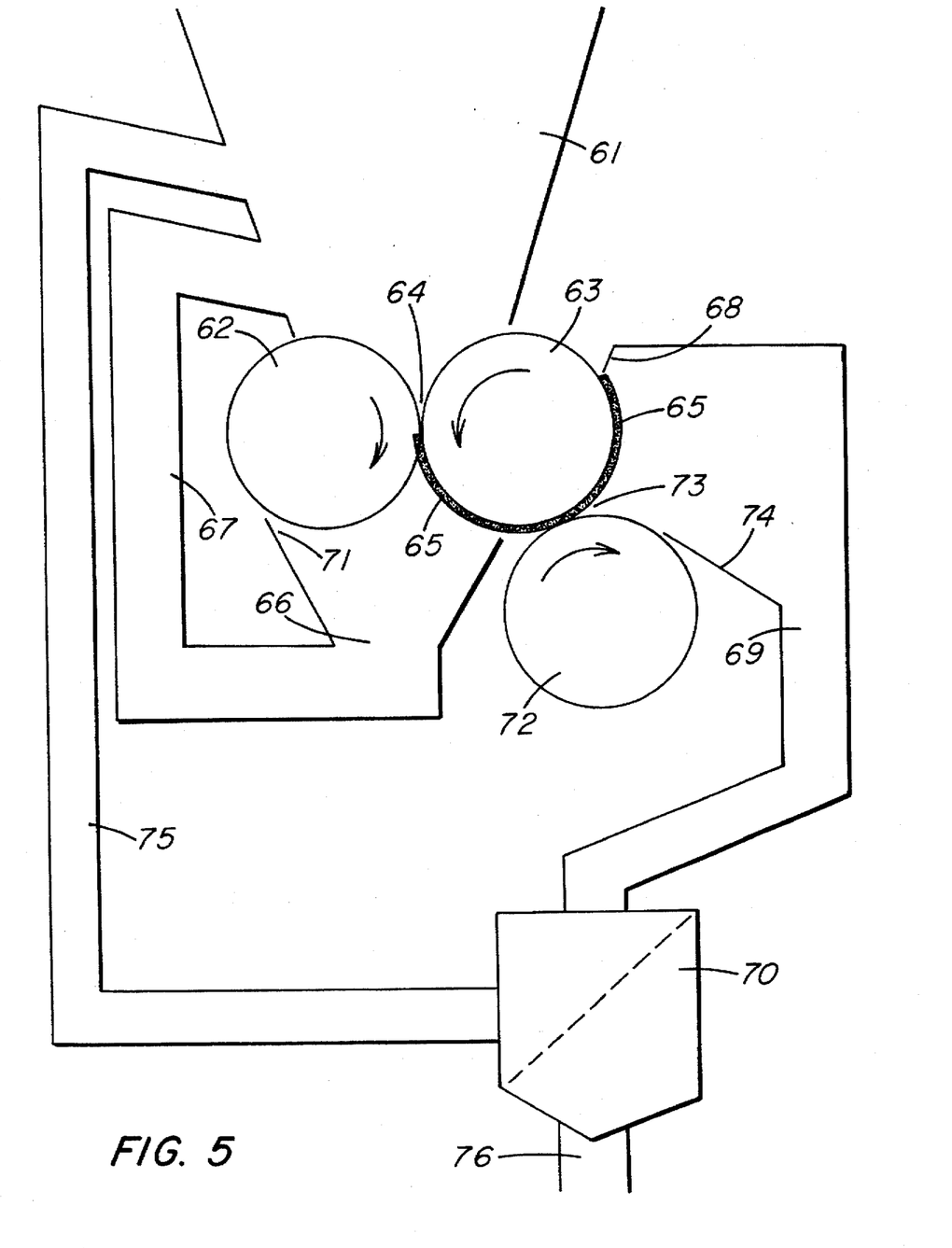
FIG. 5 is a schematic view of another embodiment of the process wherein a third roller in combination with the roller having a higher circumferential speed forms a second roll slit.

When performing the process in accordance with the diagram shown in FIG. 5, scrap material which has been precomminuted to a suitable size reaches roll slit 64 formed by two rollers 62, 63, via feed hopper 61. Rollers 62, 63 have the same diameter; roller 63 does however rotate with a higher circumferential speed. A sheet 65 of fine particles is formed on roller 63, while the coarse fraction falls freely into collecting hopper 66 located thereunder and is returned to feed hopper 61 by means of a conveyer 67, for example a drag chain. Roller 63 forms a second roll slit 73 with a more slowly rotating roller 72, through which sheet 65 is passed. A scraper 74 strips the residues from roller 72. Scraper 68 strips sheet 65 from roller 63 and this reaches screening device 70 via chute 69. The coarse fraction removed by screening is delivered to feed hopper 61 via conveyer 75; the fine fraction is withdrawn via outlet 76. Roller 62 is cleaned of residues by scraper 71 and these are delivered to conveyer 67 with the coarse fraction. If roller 72 rotates more rapidly than roller 63 then at least some of sheet 65 crosses over onto roller 72 when passing through roll slit 73.

Figure 6:
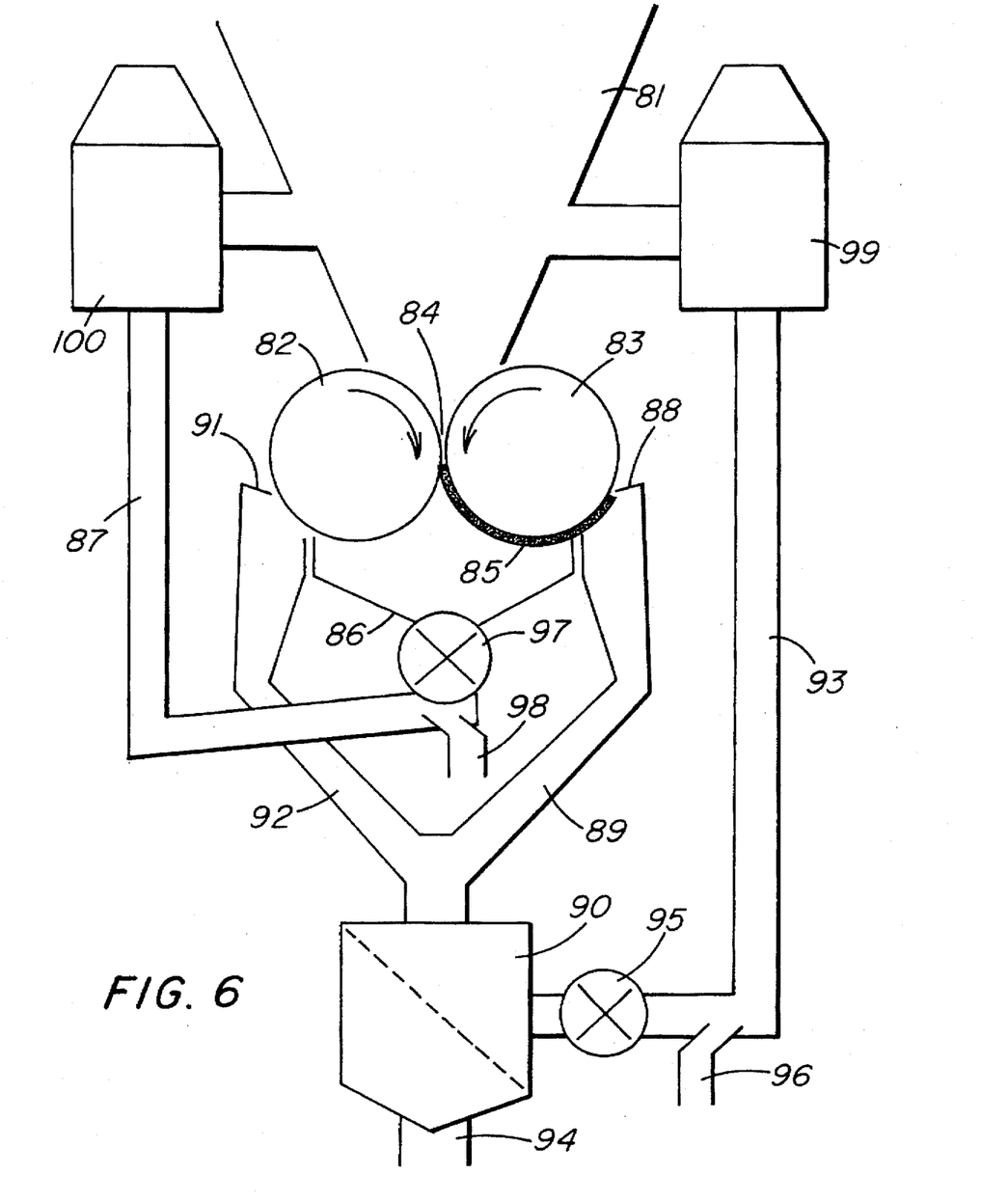
FIG. 6 is a schematic view of another embodiment of the process wherein the coarse fraction is returned to the feed hopper, via a cellular wheel sluice by means of compressed air and also via a cyclone.

When performing the process in accordance with the diagram shown in FIG. 6, scrap material which has been precomminuted to a suitable size reaches roll slit 84 formed by two rollers 82 and 83, via feed hopper 81. The rollers 82 and 83 have the same diameter; the roller 83 does however rotate at a higher circumferential speed. A sheet 85 of finer particles is formed on roller 83, whereas the coarse fraction falls freely into a collecting hopper 86 and is returned, via a cellular wheel sluice 97 by means of compressed air issuing from nozzle 98, through a pipe 87 to feed hopper 81 via cyclone 100. The sheet 85 is detached from the roller 83 by a scraper 88 and passes to a screening device 90 via a chute 89. The roller 82 is also freed of residues by means of a scraper 91, which residues are also delivered to screening device 90 through a chute 92. The screened coarse fraction is returned, via a cellular wheel sluice 95 by means of compressed air issuing from nozzle 96, through a pipe 93 to feed hopper 81 via cyclone 99, whereas the fine fraction is discharged via outlet 94 and delivered to an intermediate storage facility or passed on directly for further processing. If the particles of the fine fraction obtained from the sheet 85 are sufficiently small screening can be dispensed with and the particles can be directly processed further. In this case the screening device 90 and components 95, 96, 93 and 99 of the conveying device can be dispensed with. If the material is conveyed via cooled compressed air the material can be additionally cooled in addition to the cooling of the rollers.

Figure 7:
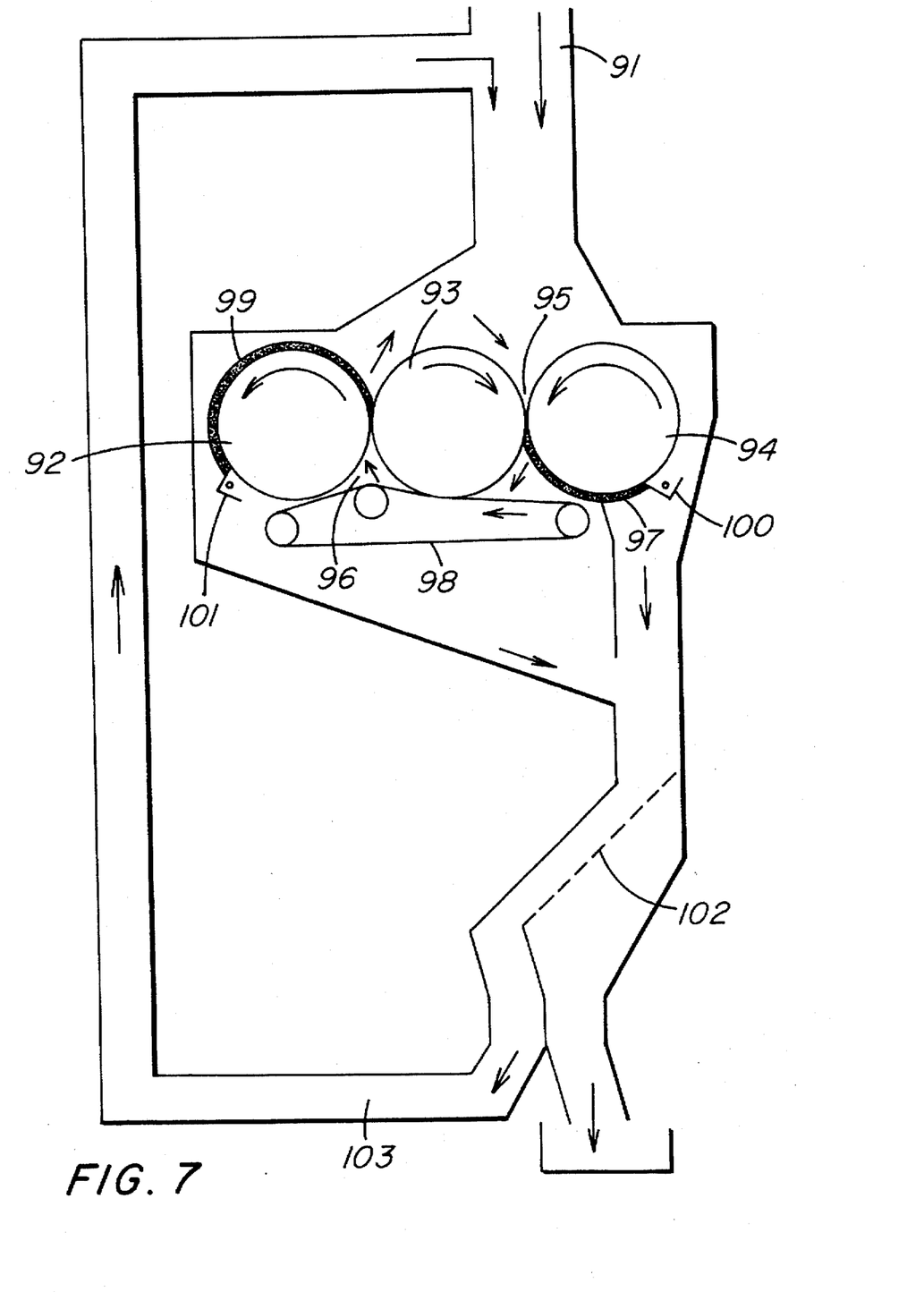
FIG. 7 is a schematic view of another embodiment of the process wherein the roller mills consists of three rollers.

A further preferred embodiment of the invention is depicted in FIG. 7. The roller mill consists of three adjacent rollers 92, 93 and 94. The two outer rollers 92 and 94 rotate more rapidly than the roller 93 in the middle. The three rollers form two roll slits 95 and 96. The material to be pulverised falls from the feed hopper 91 first of all into the first roll slit 95, a first sheet 97 of finely divided material being formed on roller 94. The coarse fractions fall onto the conveyor belt 98 and are delivered to the second roll slit 96, a second roller sheet 99 being formed on roller 92. Any remaining coarse fractions are returned to the first slit 95 by means of roller 93.

The conveyor belt 98 rests at least against roller 92, so that no coarse material issues between roller 92 and conveyor belt 98. The velocity of the conveyor belt 98 corresponds to the circumferential speed of the slow roller 93.

Sheets 97 and 99 are removed from the rollers by means of wipers 100 and 101 and are passed onto the screen 102, where finely divided powder is separated from oversized particles. The oversized particles are returned to roll slit 95 through channel 103.

EXAMPLE

The preparation of a powder from a foamed polyisocyanate-polyaddition product:

a) Preparation of component A 60 parts by wt. of a trifunctional polyether, molecular weight 6000, prepared by the addition of a total of 87% of PO and 13% of EO to TMP, 40 parts by wt. of a filled polyether, molecular weight 6000, prepared by the block-wise addition of 68.75% of PO, 14.58% of EO and 16.66% of a TDI/hydrazine polyaddition product to TMP, 3.8 parts by wt. water,
0.05 parts by wt. catalyst 1,
0.25 parts by wt. catalyst 2,
0.45 parts by wt. catalyst 3,
0.4 parts by wt. diethanolamine cross-linking agent
1.0 parts by wt. of a stabiliser based on a polysiloxane/ polyether block copolymer are mixed together and homogenised by stirring.

b) Preparation of component B

TDI 80/20 and PMDI are homogeneously mixed in a ratio of 70:30.

c) Preparation of the polyisocyanate/polyaddition product 105.95 parts by wt. of component A are mixed with 48.5 parts by wt. of component B and homogenised for 5 seconds with a laboratory stirrer (diameter of the stirring blade ca. 5 cm) at 4200 min$^{-1}$. The reaction mixture is then immediately placed in a mould treated with a wax-based release agent and pre-heated to 55° C. and the mould is closed. After 10 minutes moulding time, the foamed polyisocyanate/ polyaddition product is demoulded.

d) Precomminution

The demoulded article is precomminuted on a commercial cutting mill, obtainable e.g. from the Pallmann Co., Zweibrücken (FRG), Model PS-4-5, to give ca. 10 to 20 mm sized flakes, which are then introduced into the roller mill.

e) Pulverisation

In the following example, a laboratory roller mill of type SK 6612 from Berstorff, Hannover (FRG), as shown in FIG. 1, was used. This machine has two rollers with fixed bearings whose speeds can be independently regulated within the range 7 to 31.5 min$^{-1}$, with circumferences of 62 cm and lengths of 45 cm; the roll slit can be reduced to less than 0.1 mm. The rollers were not heated during the milling processes.

In the milling test the speeds of rotation were set at 30 min$^{-1}$ for roller 3 and 5 min$^{-1}$ for roller 2; roll slit 4 had a width of 0.1 mm. 1 kg of the product—prepared as described above—was placed in the machine, a little at a time, and ca. 900 g of coarse flakes were obtained directly under the pair of rollers 2, 3, which fall directly from roll slit 4. These flakes still have a size of between 5 and 10 mm. Physically separated from this material, ca. 100 g of powder were removed from roller 3 using scraper 8. An average particle size of 200 μm was determined for this powder.

f) Determination of particle size

The particle size was determined in a process using a light microscope with subsequent transmission of the image to a computer followed by evaluation of the images using image evaluation software. Here, the area of the particle at right angles to the direction of observation projected onto the plane of observation is measured, this area being approximated to the area of a circle whose diameter is then calculated. This process gives good results, comparable to sieve analysis, for those particles whose shape differs only slightly from that of spheres.

The average particle sizes quoted are the particle sizes (=diameter of a sphere with the same mass) at which 50% of all particles are smaller and 50% of all particles are larger than the value quoted.

We claim:

1. A process for pulverizing polyurethane, polyurea and/or polyurethane/polyurea materials in a roller mill in which at least two rollers rotate at different circumferential speeds comprising:

a) passing precomminuted material to be milled into a roll slit formed by the rollers to form a coarse fraction and a separate sheet of fine fraction;

b) collecting said coarse fraction falling freely downstream from said roll slit;

c) returning said coarse fraction to said roll slit; and d) scraping said sheet from one of said rollers so as to produce a plurality of discrete particles for further processing.

2. A process according to claim 1, wherein the fine fraction is again classified into coarse and fine particles and the coarse particles are returned to the roll slit.

3. A process according to claim 1, wherein the sheet adhering to roller is passed directly to a roll slit formed between this roller and a third roller by means of this roller.

4. A process according to claim 1, wherein the coarse fraction to be returned is cooled.

5. A process according to claim 1, wherein the material to be milled is a polyurethane rigid foam.

6. A process according to claim 1, wherein the material to be milled is a polyurethane flexible foam.

7. A process according to claim 1, wherein the material to be milled is a polyurethane structural foam.

8. A process according to claim 1, wherein the material to be milled is a RIM material made from polyurethane, polyurethane/polyurea or polyurea.

* * * * *